United States Patent [19]

Stuckmann et al.

[11] Patent Number: 5,174,898

[45] Date of Patent: Dec. 29, 1992

[54] METHOD OF TREATING AN ORGANIC SLUDGE, ESPECIALLY PAINT SLUDGE

[75] Inventors: Otto Stuckmann, Recklinghausen; Peter Hombach, Essen; Wolfgang Rüger, Sprockhövel; Karl Grosse, Wetter; Wolfgang Leiner, Bochum; Winfried Schmidt, Münster; Reinhard Diekmann, Witten, all of Fed. Rep. of Germany

[73] Assignee: Parkner GmbH, Recklinghausen, Fed. Rep. of Germany

[21] Appl. No.: 847,903

[22] Filed: Mar. 6, 1992

[30] Foreign Application Priority Data

Mar. 7, 1991 [EP] European Pat. Off. ......... 91103455.1

[51] Int. Cl.$^5$ .......................... C02F 3/30; C02F 11/02
[52] U.S. Cl. ..................................... 210/609; 210/622; 210/630; 210/631; 210/669; 210/804
[58] Field of Search ............... 210/605, 609, 613, 622, 210/630, 631, 663, 669, 804, 805

[56] References Cited

U.S. PATENT DOCUMENTS

| | | | |
|---|---|---|---|
| 2,786,025 | 3/1957 | Lamb et al. | 210/609 |
| 3,300,402 | 1/1967 | Grich et al. | 210/630 |
| 4,033,763 | 7/1977 | Markels, Jr. | 210/609 |
| 4,460,470 | 7/1984 | Reimann | 210/630 |

FOREIGN PATENT DOCUMENTS 0064960  4/1983  European Pat. Off. .
0237001  8/1987  European Pat. Off. .
627718   1/1982  Switzerland .

OTHER PUBLICATIONS

Chemical Abstracts, Pub. American Chemical Society, 60-Sewage, Wastes, vol. 93. 1980, 2 pages.

Primary Examiner—Stanley S. Silverman
Assistant Examiner—Christopher Upton
Attorney, Agent, or Firm—Herbert Dubno

[57] ABSTRACT

A paint sludge is subjected to aerobic biodegradation with increased dry content of the resulting sludge and the latter is then subjected to anaerobic biological degradation. The effluent from the two biostages are sterilized by ozonization, UV-irradiation or peroxide addition. The sludge from the anaerobic biostage can be dried to an inert granulate and drying vapors are recycled to the aerobic biostage. The sterile liquid is returned to the wash water circulation of the painting plant.

9 Claims, 2 Drawing Sheets

5,174,898

METHOD OF TREATING AN ORGANIC SLUDGE, ESPECIALLY PAINT SLUDGE

FIELD OF THE INVENTION

Our present invention relates to a method of treating an organic sludge, especially a paint sludge obtained from a coating unit such as a paint spray booth and wherein the sludge is obtained as part of a system for recirculating water from a settling basin or tank receiving the overspray wash liquor from the paint spray booth. The treatment, in the terms of the present invention, means a recovery of components of the organic sludge and the term "organic sludge" is used herein to refer to a sludge which contains organic components.

BACKGROUND OF THE INVENTION

Paint sludges arise usually in paint spray installations in which, in a chamber, a suspended article such as a vehicle body, is subjected to spraying with a paint. The excess of the spray can reach walls of the spray booth as a so-called overspray and the overspray is washed with water away from the spray booth to form a contaminated aqueous suspension and solution which is led to a settling tank or basin. As part of the washing of the walls from the overspray and the removal of the overspray from the spray booth, a de-adhesive action is required. That means that additives must be provided for the scrubbing water which will cause the breakdown of the film forming paint spray into discrete particles which, depending upon the type of additive, will either float or settle out. In the mass production of automobiles, the paint tunnels or booths are operated at high rates and the de-adhesive substances which are used are primarily bentonite or clay minerals, waxes in certain cases and the like. Other customary additives are defoamers and sedimentation aides or auxiliaries, and biocides.

Especially in the case of so-called water paints, there is a high organic loading of the washing liquor with respect to solvents. Additional organic matter is imported in the form of the defoamers, sedimentation auxiliaries and biocides.

Because of the accumulation of organic loading, the water of the recycled scrubbing liquor must be replaced at time intervals of 4 to 12 months. The paint sludge can be dewatered in filter presses to a dry content of about 50 weight percent and, in the past, was disposed of in landfills or incinerated.

Since landfill disposal of paint sludges is no longer environmentally sound and in many places is illegal and therefore impossible, incineration is the only prior art approach which could be considered up to this point in time.

However, this method of disposal poses problems as well since, by and large, there is insufficient incineration capacity and incineration does not allow any kind of recycling or recovery of usable materials from the waste.

A variety of different recycling approaches have been attempted without success. For example, efforts have been made to recycle the paint sludge as an additive to liquors with reduced quality requirements as fillers. Efforts have also been made to work paint sludge into sealing compositions or bituminous products, to substitute the paint sludge for phenolic resins in the production of plastic molded products and to recover titanium dioxide from the paint sludge by a combustion process.

All of these processes have limitations. All of the described techniques with the exception of the recovery of titanium dioxide are dependent upon conditions of the paint sludge such as age, level of impurities, biological contamination and the presence of toxic or noxious components so that usually only a small portion of the paint sludge which is generated can be used.

In the production of titanium dioxide, combustion can create an ecologic problem and, furthermore, the technique is usually economically disadvantageous.

OBJECTS OF THE INVENTION

It is, therefore, the principal object of the present invention to provide an improved process for the treatment of an organic sludge derived from settling of a paint scrubbing liquor, to produce a nontoxic inert product which significantly reduces the mass of any residue which must be subjected to landfill and which is also economical.

Another object of the invention is to provide a method of treating paint sludge obtained from a lacquer spray installation, especially for the mass production of automotive vehicles, whereby drawbacks of earlier disposal method are avoided.

SUMMARY OF THE INVENTION

These objects and others which will become apparent hereinafter are attained, in accordance with the invention by a method in which the sludge is subjected to reaction in a first biostage under aerobic conditions to decompose low molecular weight organic compounds such as the solvent, a sludge with increased dry substance content is recovered and a clarified liquid is decanted, the sludge from the first biostage is subjected to decomposition in a second biostage under anaerobic conditions to decompose the higher molecular weight organic compounds, a sludge with increased dry substance content is obtained from this second biostage and a second clarified liquid is drawn off, the sludge from the second biostage is dried and preferably granulated to an inert product and the condensate formed during the drying is fed back to the first biostage, and the clarifier liquids from the two biostages are sterilized and fed back to the water circulated in the spray booth scrubbing system.

The process of the invention is distinguished from hitherto known approaches to the disposal of the sludge by using biotechnical techniques and by its universal applicability. The process of the invention can be used practically with all paint sludges arising in practice, including paint sludges from hydrolacquering systems.

An important advantage of the invention is that the recirculating water in the painting plant need not be replaced, although it may have to be replenished slightly, so that the painting plant can operate practically free from the generation of waste water effluents.

The products which must be subjected to landfill disposal are reduced greatly in amount and are in the form of inert granular material which can be safely deposited in a landfill or even incorporated in bituminous compositions as a road paving material or other aggregate.

According to a feature of the invention, the first biological degradation stage yields a sludge which is fed to the second biological degradation stage with a dry substance content of 5 to 15% by weight, preferably 10% by weight.

The sludge which is recovered from the second biological degradation stage and is subjected to drying, has a dry substance content of 40 to 60% by weight, preferably 50% by weight.

The drying of the sludge recovered from the second biological degradation stage is preferably carried out at a temperature in the range of 70° C. to 120° C. and most preferably under vacuum by vacuum distillation, at a temperature of 70° C. to 80° C. and preferably 75° C.

The sterilization of the clarifier effluents of the first and second biological degradation stages can be effected by ozonization, UV-irradiation and/or by the addition of peroxide.

We have found, in a preferred embodiment of the invention, that it is possible to further reduce the amount of the inert granulate which is produced if the sludge withdrawn from the settling basin is separated by decantation into a decanter sludge with a dry content of 40 to 60 weight percent, preferably 50 weight percent and a decanter effluent. The decanter sludge is subjected to a resin extraction and thereafter is introduced into the first aerobic biodegradation stage. The decanter effluent is subjected to aerobic degradation in a further aerobic stage, the surplus biomass of which is then transferred to the second anaerobic biological degradation stage and the clarifier effluent of which is united with the other clarifier effluent. The resin extraction can recover reusable products. Because of the biological degradation stages, problems with toxicity and noxious components in the compositions can be avoided.

BRIEF DESCRIPTION OF THE DRAWING

The above and other objects, features and advantages of our invention will become more readily apparent from the following description, reference being made to the accompanying highly diagrammatic drawing in which.

SPECIFIC DESCRIPTION AND EXAMPLES

Figure 1:
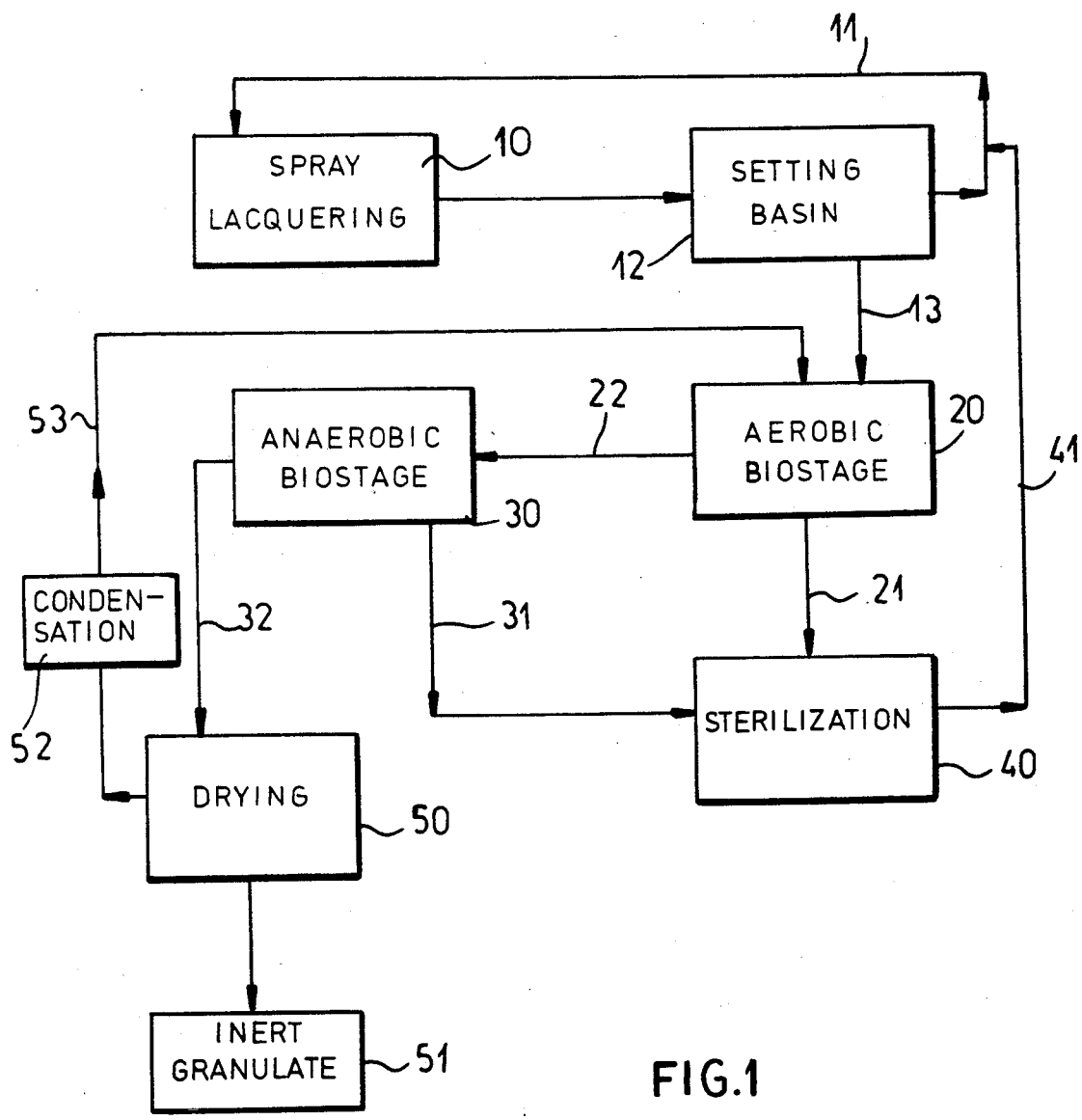
FIG. 1 is a flow diagram illustrating one treatment method according to the invention.
Figure 2:
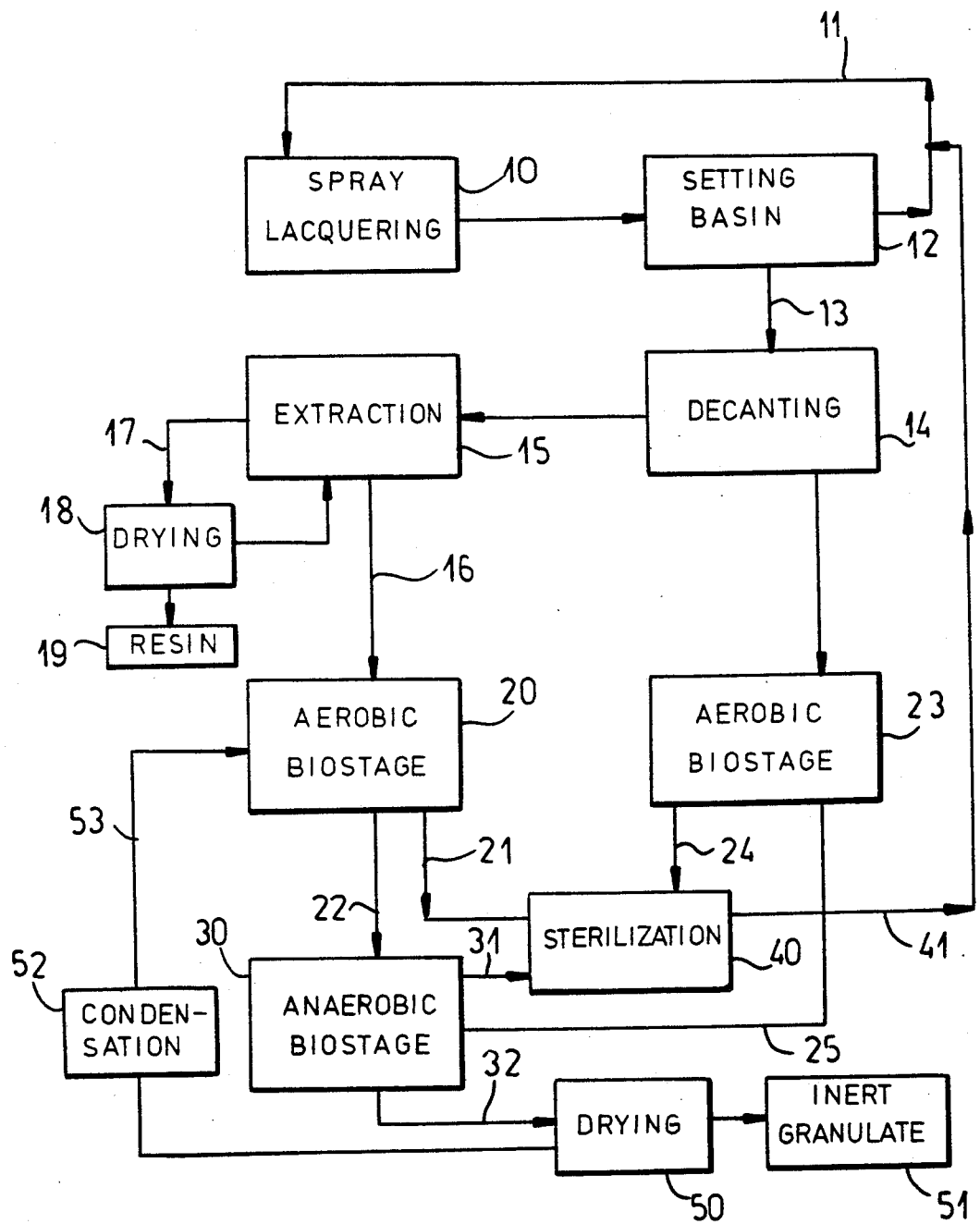
FIG. 2 is another block diagram of another embodiment of the process of the invention.

In both FIG. 1 and FIG. 2 a paint sludge is obtained from a spray painting booth 10 from which the overspray washed from the walls in a continuous recirculation of water represented at 11, is delivered to a settling basin 12. From the settling basin, the decantate is recycled as the wall washing water in the circulation 11. The paint sludge is carried off by a line 13.

In the embodiment of FIG. 1, the sludge with a dry substance content of about 2 weight percent is fed to a first biological degradation stage 20 which is operated aerobically, e.g. with adapted and augmented mixed cultures of aerobically effected microorganisms suitable for use in conventional aerobic sewage treatment plants. The first biological degradation stage is operated for a period and, temperature and in the presence of air sufficient to produce a sludge with a dry solids content of 10% by weight. The primary effect of the aerobic stage is the breakdown of the low molecular weight organic compounds in the paint sludge, especially the solvents contained therein. The clarified effluent from the first biological degradation stage is carried off at 21 while the sludge is carried off at 22.

The sludge from the first biological degradation stage is delivered to the anaerobic biological degradation stage 30 in the basin of which an anaerobic decomposition of solid or dissolved high molecular weight organic compounds is effected under anaerobic conditions. Here as well natural anaerobic microorganisms or adapted and augmented mixed cultures of anaerobic microorganisms suitable for use in the anaerobic stages of conventional sewage treatment may be used.

The conditions are controlled such that a sludge with a dry substance content of about 50 weight % is obtained.

The clarified effluent from this stage is carried off at 31 and with the clarified effluent from the aerobic stage is subjected to sterilization at 40. The sterilized effluent is recycled at 41 to the wash water recirculation 11 of the paint plant.

The sludge withdrawn from the second or anaerobic biostage 30 is fed at 32 to a dryer 50 in which it is dried at about 75° C. at a pressure of 0.2 to 1 bar to produce an inert granulate 51. The vapors produce during the drying are condensed and the condensate are condensed at 52 and the condensate is fed at 53 back to the first aerobic biostage. The sterilization at 40 is effected by ozonization, UV-irradiation and/or the addition of peroxide to the solution.

In the embodiment of FIG. 2, the sludge from the settling basin 12 is delivered at 13 to a decanter 14 from which a decanter sludge with a dry substance content of 50% by weight is fed to a resin extractor 15 and after resin extraction is supplied at 16 to the first aerobic biological degradation stage 20 which is operated in the manner described. The resin extraction stage is operated with a recirculating hydrophobic solvent which is capable of taking up resins from the sludge and, upon evaporation of the solvent, releasing the resins. The solvent recirculation is represented at 17 and its drying stage at 18 to yield the resins at 19.

The decanted effluent is fed to another aerobic biological degradation stage 23, the effluent of which passes at 24 to the sterilizer 40 together with the effluent passing via line 21 from aerobic stage 20 and the effluent from the anaerobic stage 30 from line 31.

As in the embodiment of FIG. 1, the sludges from the aerobic biological degradation stages 20 and 23 are fed at 22 and 25 to the anaerobic biodegradation stage 30 from the latter, the sludge is fed to the dryer via line 31 and from dryer 50 the inert granulate is recovered at 51. The condensate is formed from the dryer vapors at 52 and is recycled at 53 to the aerobic biostage 20.

The sterilized water is returned at 41 to the water circulation 11 in the painting plant which includes the paint booth 10 and the settling basin 12. The drying stage 18 at which the resin 19 may be recovered can be a conventional distillation unit for the solvent and the resin recovered at 19 is a reusable resin which can be employed in paint.

We claim:

1. A method of treating paint sludge from a painting plant in which a wash water is recirculated between a spray booth and a settling basin and a paint sludge is formed in said settling basin, said method comprising the steps of:

(a) subjecting said sludge withdrawn from said settling basin to aerobic degradation in a first biostage to decompose low molecular weight organic compounds and produce a first biostage sludge of greater dry substance content than the sludge from said basin and a first biostage clarifier effluent;

(b) biologically degrading said first biostage sludge under anaerobic conditions in a second biostage to decompose high molecular weight organic compounds and produce a second biostage sludge with increased dry substance content over said first biostage sludge and a second biostage clarifier effluent;

(c) drying said second biostage sludge with the production of vapors to produce a dry product;

(d) condensing said vapors to form a condensate;

(e) recirculating said condensate to said first biostage;

(f) sterilizing said first biostage effluent and said second biostage effluent to produce a sterile effluent; and (g) recirculating said sterile effluent to said wash water.

2. The method defined in claim 1 wherein said first biostage sludge has a dry substance content of 10 to 15% by weight.

3. The method defined in claim wherein said second biostage sludge has a dry substance content of 40 to 60% by weight.

4. The method defined in claim 1 wherein said second biostage sludge is dried at subatmospheric pressure at a temperature of 70° to 80° C.

5. The method defined in claim 1 wherein said first biostage effluent and said second biostage effluent are sterilized by ozonization.

6. The method defined in claim 1 wherein said first biostage effluent and said second biostage effluent are sterilized by UV-irradiation.

7. The method defined in claim 1 wherein said first biostage effluent and said second biostage effluent are sterilized by the addition of peroxide.

8. The method defined in claim 1 wherein sludge withdrawn from said basin is subjected to decantation into a decanter sludge with a dry substance content of 40 to 60% by weight and a decanter effluent, said decanter sludge is subjected to a resin extraction, said decanter sludge after resin extraction is introduced into said first biostage, and said decanter effluent is subjected to biodegradation in an aerobic third biological degradation stage from which third biostage sludge is fed to said second biostage and a third biostage clarifier effluent is combined with the first and second biostage effluents.

9. The method defined in claim 8 wherein said resin extraction is effected in a closed solvent circulation with a resin dissolving solvent.

* * * * *